United States Patent [19]

Weyland et al.

[11] Patent Number: 5,171,604
[45] Date of Patent: Dec. 15, 1992

[54] FAT BLENDS FOR CHOCOLATE COMPOSITIONS

[75] Inventors: Mark Weyland, London; Deryck J. Cebula, Bushmead Fields, both of Great Britain; Willem Dekker, Hoorn, Netherlands

[73] Assignee: Van den Bergh Foods Co., Division of Conopco Inc., New York, N.Y.

[21] Appl. No.: 681,024

[22] Filed: Apr. 5, 1991

[30] Foreign Application Priority Data

Apr. 5, 1990 [EP] European Pat. Off. ........ 90303671.3

[51] Int. Cl.$^5$ ............................................. A23D 7/00
[52] U.S. Cl. ................................... 426/607; 426/603
[58] Field of Search ............................... 426/607, 603

[56] References Cited

U.S. PATENT DOCUMENTS

| | | |
|---|---|---|
| 4,072,766 | 2/1978 | Luddy et al. . |
| 4,127,597 | 11/1978 | Craig, Jr. et al. . |
| 4,167,519 | 9/1979 | Hock et al. . |
| 4,234,618 | 11/1980 | Jasko ................... 426/607 |
| 4,348,423 | 9/1982 | Pairaud et al. . |
| 4,366,181 | 12/1982 | Dykshoorn ............ 426/603 |
| 4,396,639 | 8/1983 | Bodor .................. 426/607 |
| 4,588,604 | 5/1986 | Baker et al. . |
| 4,601,857 | 7/1986 | Luddy et al. . |
| 4,839,191 | 6/1989 | Luddy et al. . |
| 4,847,105 | 7/1989 | Yokobori .............. 426/607 |
| 4,861,611 | 8/1989 | Baba et al. . |
| 4,873,109 | 10/1989 | Tanaka ................. 426/607 |
| 4,880,658 | 11/1989 | Luddy et al. . |
| 4,888,197 | 12/1989 | Wieske ................. 426/603 |
| 5,069,915 | 12/1991 | Devitt ................. 426/631 |

FOREIGN PATENT DOCUMENTS

| | | |
|---|---|---|
| 0006034 | 12/1979 | European Pat. Off. . |
| 0062938 | 10/1982 | European Pat. Off. . |
| 0293194 | 11/1988 | European Pat. Off. . |
| 61-254143 | 11/1986 | Japan . |
| 2013705 | 8/1979 | United Kingdom . |

OTHER PUBLICATIONS

McGraw-Hill Dictionary of Scientific and Technical Terms (1984) p. 1116.
Kirk-Othmer, Encyclopedia of Chemical Technology (1979 ed.) vol. 6, pp. 9-10.

*Primary Examiner*—Carolyn Paden
*Attorney, Agent, or Firm*—Rimma Mitelman

[57] ABSTRACT

The invention concerns with fat blends comprising cocoa butter and butter olein and optionally cocoa butter equivalent and butter fat.

These blends can be used in chocolate compositions. In the processing of chocolate compositions they are used to lower the viscosity at temper of these compositions.

12 Claims, No Drawings

FAT BLENDS FOR CHOCOLATE COMPOSITIONS

BACKGROUND OF THE INVENTION

The invention concerns new fat blends, that can be used in chocolate compositions. So far cf. for example EP No. 0 006 034, fat blends are known for this application that contain cocoa butter and butter fat, whereas part of the cocoa butter may be replaced by a cocoa butter equivalent (CBE). These fat blends possess a certain hardness as e.g. can be defined by the Stevens texture. When in these blends the butter fat is at least partly replaced by an oil, while the total fat content remains the same, it was expected that the Stevens hardness would become too low. However we have found new fat blends in which at least part of the butter fat is replaced and in which yet the Stevens hardness remains satisfactory, whereas the performance of such fat blends, when used in chocolate compositions is good both in continuous and in batch temper processes, especially the viscosity of these compositions at temper is very satisfactory, e.g. expressed as the viscosity difference between the viscosity at temper and at 50° C. This is in particular advantageous because a too high viscosity leads to problems in the processing of the chocolate compositions. Another advantage of a lower viscosity is, that many chocolates at temper would benefit from a greater flexibility, because of the lower viscosity, in different applications e.g. depositing, enrobing etcetera, wherein a different flow behavior is required.

SUMMARY OF THE INVENTION

In the fat blends according to the invention at least part of the butter fat is replaced by a butter olein (=Bu-f).

Therefore the invention concerns in the first place fat blends, comprising 50-75 wt % cocoa butter (=CB), 10-35 wt % of butter olein with a melting point of maximum 20° C., 0-25 wt % of a cocoa butter equivalent (=CBE) and 0-25 wt % of butter fat. The butter olein has preferably an $N_{20}$ value of less than 5.0. In particular butter olein with an $N_{10}$ value of 5-15 and an I.V. of more than 35 are used.

The butter olein, that we prefer to use is preferably obtained by dry fractionating butter fat and is preferably present in the fat blends in amounts of 12-20 wt %.

The fat blends in general contain 50-75 wt % cocoa butter, although we prefer to use 60-70 wt % CB.

DETAILED DESCRIPTION OF THE INVENTION

Part of the CB can be replaced by a cocoa butter equivalent (=CBE). Therefore, we use blends, that contain 0-25 wt % CBE, however we prefer to use 10-20 wt % CBE in the fat blend. As CBE's, that are useful in our fat blend, the following compounds can be used either alone or admixed: Palm oil fractions and shea stearine. Preferably we use our own commercial CBE-products, like Coberine, as such or as mixtures.

Although fat blends with the desired properties are obtained, when their composition is in accordance with the above mentioned compositions even better fat blends are obtained, when we take into consideration the weight-ratio liquid oil:CB and the weight ratio liquid oil:CBE in the fat blend. So fat blends with very good properties consist of blends in which butter olein is present and in which the ratio BUf:CB =0.15-0.40 and in which a CBE is used in such amounts that the weight ratio BUf:CBE =0.7-1.5.

The invention also concerns chocolate composition containing the above described fat blends. In general these chocolate compositions contain at least 20 wt %, preferably at least 30 wt % of the fat blends. Also food products, containing the chocolate compositions are part of the invention.

The fat blends can be used advantageously in chocolate compositions to improve the viscosity of the chocolate compositions at temper (compared with fat blends not containing butter olein). The tempering time, that is the time required to reach the right degree of temper, according to the Greer test, is not influenced by the incorporation of butter olein in the fat blend to an unacceptable extent.

The influence of the use of butter olein in the fat blend on the viscosity of the chocolate composition at temper however is far more pronounced.

In order to quantify this improvement in viscosity we can consider the viscosity difference (in poises) between the apparent viscosity of the chocolate composition at temper, using a shear rate of 5.4 $s^{-1}$ and the apparent viscosity at 50° C. High viscosity at temper leads to problems in the processing of the chocolate composition. However we also can measure the apparent viscosity at temper itself (cf: example II). In order to illustrate the invention the following examples are given:

EXAMPLE I

Continuous tempering process

Chocolate compositions with the compositions as illustrated in table I were prepared:

TABLE I

| Choc. comp | A (compar.) wt % | B (compar.) wt % | C (acc. invention) wt % |
| --- | --- | --- | --- |
| non-fat solids | 68.9 | 68.9 | 68.9 |
| CB | 19.30 | 22.6 | 20.8 |
| BU | 6.30 | 3.05 | — |
| BU-f | — | — | 4.60 |
| CBE | 5.00 | 5.00 | 5.20 |
| Lec | 0.50 | 0.50 | 0.50 |

The fat phases of these compositions therefore consisted of:

| | wt % | wt % | wt % |
| --- | --- | --- | --- |
| CB | 63.00 | 73.70 | 68.00 |
| BU | 20.70 | 10.00 | — |
| BUf | — | — | 15.00 |
| CBE | 16.30 | 16.30 | 17.00 |

Using the above chocolate compositions in near identical conditions of continuous tempering i.e. same throughput and cooling/heating conditions in same apparatus lead to the following chocolate evaluations (see table II):

TABLE II

| Composition Choc. evaluation: | A | B | C |
| --- | --- | --- | --- |
| temp. time (min) | 35 | 24 | 26 |
| $\eta_{50}$: visc. at 50° C. (poise) | 87 | 135 | 120 |
| $\eta_t$: visc. at temper (poise) | 307 | 430 | 244 |
| diff. visc. | 220 | 295 | 124 |
| $\eta_t$-$\eta_{50}$ | 2.5 | 2.2 | 1.0 |

TABLE II-continued

| Composition Choc. evaluation: | A | B | C |
|---|---|---|---|
| ηt | | | |

EXAMPLE II

Batch tempering process

All chocolate-compositions were made according to the same basic recipe. This basic composition comprised the following ingredients:

| | CB/BU or BUf/CBE | |
|---|---|---|
| | 64/19/17 | 68/15/17 |
| Powdered sugar | 37.6 wt % | |
| Cocoa mass | 12.0 wt % | |
| CB | 15.8 wt % | 17.2% |
| Skimmed milk powder | 22.0 wt % | |
| Bu and/or Buf | 6.65 wt % | 5.25% |
| CBE | 5.95 wt % | |
| Lec | 0.5 wt % | |

The fat phase consisted of the following ingredients:

| Fat-Phase | CB | BU | BUf | CBE | |
|---|---|---|---|---|---|
| 1 | 64 | 19 | — | 17 | |
| 1* | 64 | — | 19 | 17 | CBE I |
| 2 | 68 | 15 | — | 17 | |
| 2* | 68 | — | 15 | 17 | |
| 3 | 68 | 15 | — | 17 | ibid. |
| 3* | 68 | — | 15 | 17 | |
| 4 | 68 | 15 | — | 17 | CBE II |
| 4* | 68 | — | 15 | 17 | |
| 5 | 68 | 15 | — | 17 | CBE III |
| 5* | 68 | — | 15 | 17 | |
| 6 | 68 | 15 | — | 17 | CBE IV |
| 6* | 68 | — | 15 | 17 | |
| 7 | 68 | 15 | — | 17 | CBE V |
| 7* | 68 | — | 15 | 17 | |

As CBE's (I–V) different mixtures of shea stearin and/or different palm oil fractions were used, that possessed the following N-profiles:

| CBE | N20 | N25 | N30 | N32.5 | N35 |
|---|---|---|---|---|---|
| I | 78.6 | 68.4 | 37.2 | 12.3 | 0.9 |
| II | 82.9 | 73.0 | 33.4 | 2.6 | 1.4 |
| III | 54.9 | 42.0 | 15.6 | 2.1 | 0.5 |
| IV | 32.9 | 21.4 | 5.5 | 0.3 | 0.4 |
| V | 46.7 | 21.3 | 2.6 | 0.6 | 0.1 |

Using these compositions the following results were obtained:

| Fat blend | App. viscosity at temper: | temper. time |
|---|---|---|
| 1 | 14.1 Pa.s | 27 min |
| 1* | 6.0 | 44 |
| 2 | 9.0 | 35 |
| 2* | 6.8 | 43 |
| 3 | 11.5 | 46 |
| 3* | 6.6 | 50 |
| 4 | 11.3 | 35 |
| 4* | 6.9 | 28 |
| 5 | 10.4 | 28 |
| 5* | 5.1 | 23 |
| 6 | 8.9 | 46 |
| 6* | 5.3 | 27 |
| 7 | 7.3 | 63 |
| 7* | 5.3 | 50 |

The compositions, which are indicated with * in this example are compositions in accordance with the invention. The other compositions are given as comparative compositions. The viscosity is measured at temper, using a shear rate of 6.2 s$^{-1}$. The processing was carried out as a batch process. As can be seen from the data the compositions according to the invention all possess a lower viscosity than the corresponding composition, in which BUf is present instead of BU. The tempering times are all within the accepted range of 20–45 min. for the compositions according to the invention.

What is claimed is:

1. Fat blend, comprising 50–75 wt % cocoa butter, 10–35 wt % butter olein with a melting point below 20° C., 0–25 wt % cocoa butter equivalent and 0–25 wt % butter fat, wherein the butter olein has an $N_{20}$ value of less than 5.0.

2. Fat blend according to claim 1, wherein 12–20 wt % of the butter olein is present.

3. Fat blend according to claim 1, wherein the butter olein is a dry fractionated butter fat fraction.

4. Fat blend according to claim 1, wherein the blend contains 60–70 wt % cocoa butter.

5. Fat blend according to claim 1, wherein the blend contains 10–20 wt % cocoa butter equivalent.

6. Chocolate compositions containing a fat blend according to claim 1.

7. Food products, containing the chocolate composition of claim 6.

8. Fat blend, comprising 50–75 wt % cocoa butter, 10–35 wt % butter olein with a melting point below 20° C. 0–25 wt % cocoa butter equivalent and 0–25 wt % butter fat, wherein the butter olein has an $N_{10}$ value of 5–15 and an I.V. of more than 35.

9. Fat blend, comprising 50–75 wt % cocoa butter, 10–35 wt % butter olein with a melting point below 20° C., 10–20 wt % cocoa butter equivalent and 0–25 wt % butter fat, wherein the cocoa butter equivalent is selected from the group consisting of shea stearine, a palm midfraction, a wet fractionated palm oil, olein, and mixtures thereof.

10. Fat blend, comprising 50–75 wt % cocoa butter, 10–35 wt % butter olein with a melting point below 20° C., 0–25 wt % cocoa butter equivalent and 0–25 wt % butter fat, wherein the blend contains butter olein (BUf) and cocoa butter (CB) in a weight ratio BUf/CG=0.15–0.40.

11. Fat blend, comprising 50–75 wt % cocoa butter, 10–35 wt % butter olein with a melting point below 20° C., 10–20 wt % cocoa butter equivalent and 0–25 wt % butter fat, wherein the blend contains butter olein and cocoa butter equivalent in a weight ratio 0.7–1.5.

12. A method of lowering viscosity of chocolate compositions at temper, the method comprising adding to said chocolate composition the fat blend comprising 50–75 wt % cocoa butter, 10–35 wt % butter olein with a melting point below 20° C., 0–25 wt % cocoa butter equivalent and 0 to 25 wt % butter fat, wherein the butter olein has an $N_{20}$ value of less than 5.0.

* * * * *

UNITED STATES PATENT AND TRADEMARK OFFICE
CERTIFICATE OF CORRECTION

PATENT NO. : 5,171,604

DATED : December 15, 1992

INVENTOR(S) : Mark WEYLAND, Deryck Josef CEBULA, Willem DEKKER

It is certified that error appears in the above-identified patent and that said Letters Patent is hereby corrected as shown below:

In Claim 10, column 4 (lines 54-55) please replace "BUf/CG=0.15-0.40" with --BUf/CB=0.15-0.40--.

Signed and Sealed this

Twenty-third Day of November, 1993

BRUCE LEHMAN

*Attest:*

*Attesting Officer*      *Commissioner of Patents and Trademarks*